US009237205B2

(12) United States Patent
Abel et al.

(10) Patent No.: US 9,237,205 B2
(45) Date of Patent: *Jan. 12, 2016

(54) MOBILE DEVICE MANNERS PROPAGATION AND COMPLIANCE

(75) Inventors: Miller Thomas Abel, Mercer Island, WA (US); Shai Guday, Redmond, WA (US); Michael Sinclair, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

This patent is subject to a terminal disclaimer.

(21) Appl. No.: 13/182,400

(22) Filed: Jul. 13, 2011

(65) Prior Publication Data

US 2011/0269445 A1 Nov. 3, 2011

Related U.S. Application Data

(63) Continuation of application No. 11/533,140, filed on Sep. 19, 2006, now Pat. No. 8,000,692.

(51) Int. Cl.
  *H04M 3/00* (2006.01)
  *H04L 29/08* (2006.01)
  *H04L 29/06* (2006.01)

(52) U.S. Cl.
  CPC .............. *H04L 67/30* (2013.01); *H04L 63/104* (2013.01); *H04L 67/04* (2013.01)

(58) Field of Classification Search
  CPC .......................................................... H04M 3/00
  USPC ......... 455/418, 558, 414.1, 403, 412.1, 556.2
  See application file for complete search history.

(56) References Cited

U.S. PATENT DOCUMENTS

| 5,485,634 A | 1/1996 | Weiser et al. |
| 5,778,304 A | 7/1998 | Grube et al. |
| 6,011,973 A | 1/2000 | Valentine et al. |
| 6,438,385 B1 | 8/2002 | Heinonen et al. |

(Continued)

FOREIGN PATENT DOCUMENTS

| EP | 1035747 A1 | 9/2000 |
| GB | 2329794 A | 3/1999 |

(Continued)

OTHER PUBLICATIONS

Notification of Indentification of Prior Art in Late Protest under 37 C.F.R. 1.291(a); United States Patent and Trademark Office; mailed Jan. 21, 2009; 11 pages.

(Continued)

*Primary Examiner* — Michael T Vu
(74) *Attorney, Agent, or Firm* — Sandy Swain; Steve Wight; Micky Minhas

(57) ABSTRACT

The present invention includes methods and technologies for defining and administering device manners policy ("DMP"), propagating DMP, reception and recognition of, and compliance with DMP. Such policy may be used to communicate to various mobile and other devices the "manners" with which compliance is expected or required. Similar to some of the social manners honored among people, such as with "no smoking" or "employees only" zones, "no swimming" or "no flash photography" areas, and scenarios for "please wash your hands" or "no talking out loud", devices may recognize and comply with analogous "device manners" policy.

19 Claims, 5 Drawing Sheets

(56) References Cited

U.S. PATENT DOCUMENTS

| | | | |
|---|---|---|---|
| 6,970,724 | B2 | 11/2005 | Leung |
| 7,069,027 | B2 | 6/2006 | Miriyala |
| 7,613,772 | B2 * | 11/2009 | Bartram et al. ............... 709/205 |
| 7,657,252 | B2 | 2/2010 | Futami |
| 8,145,241 | B2 * | 3/2012 | Singh et al. ................ 455/456.5 |
| 2002/0142754 | A1 | 10/2002 | Takatori |
| 2003/0037033 | A1 * | 2/2003 | Nyman et al. .................... 707/1 |
| 2003/0211856 | A1 * | 11/2003 | Zilliacus ........................ 455/466 |
| 2004/0072592 | A1 * | 4/2004 | Hasegawa ..................... 455/558 |
| 2005/0052998 | A1 * | 3/2005 | Oliver et al. ................. 370/231 |
| 2005/0170849 | A1 | 8/2005 | McClelland |
| 2005/0181808 | A1 | 8/2005 | Vaudreuil |
| 2005/0215241 | A1 * | 9/2005 | Okada ........................ 455/414.1 |
| 2006/0063563 | A1 * | 3/2006 | Kaufman ................... 455/556.2 |
| 2006/0099968 | A1 | 5/2006 | Harris |
| 2006/0116116 | A1 | 6/2006 | Slemmer |
| 2006/0242455 | A1 * | 10/2006 | Knowles ........................... 714/6 |
| 2007/0027972 | A1 * | 2/2007 | Agrawal et al. ............... 709/223 |
| 2007/0030973 | A1 * | 2/2007 | Mikan .......................... 380/270 |
| 2008/0014966 | A1 | 1/2008 | Chakraborty |
| 2011/0269444 | A1 | 11/2011 | Abel |

FOREIGN PATENT DOCUMENTS

| | | | | |
|---|---|---|---|---|
| GB | 2427054 A | * | 12/2006 | ............. G07C 13/00 |
| WO | WO 98/57518 A1 | | 12/1998 | |
| WO | WO 99/18745 A1 | | 4/1999 | |
| WO | WO 02/35874 A1 | | 5/2002 | |
| WO | WO 2004/059954 A1 | | 7/2004 | |
| WO | WO 2005/027564 A1 | | 3/2005 | |

OTHER PUBLICATIONS

Author: Jon M. Draheim; Screen shot from: www.randdamerica.com/ideas%20Grid.htm; Aug. 16, 2008.

Author: Internet Archive Wayback Machine; Screen shot from: http://web.archive.org/web/*/http://www.randdamerica.com/Ideas%20Grid.htm; Aug. 16, 2008.

Author: Internet Archive Wayback Machine; Screen shot from: http://web.archive.org/web/20050429225359/http://www.randdamerica.com/Ideas+Grid.htm; Aug. 16, 2008.

Nani Naguib et al. "Middleware support for context-aware multimedia applications", Proceedings of the IFIP TC6 / WG6.1 Third International Working Conference on New Developments in Distributed Applications and Interoperable Systems, 2001, pp. 9-22, vol. 198.

PSILOC "miniGPS", retrieved from http://www.psiloc.com/index.html?action=ShowArticleItem&ida=154 on Aug. 8, 2006.

* cited by examiner

MOBILE DEVICE MANNERS PROPAGATION AND COMPLIANCE

RELATED APPLICATION(S)

This application is a continuation of U.S. patent application Ser. No. 11/533,140 that was filed on Sep. 19, 2006 and that is incorporated herein by reference in its entirety.

BACKGROUND

As various types of mobile devices proliferate, a number of social issues develop. For example, a movie-goer who forgets to silence his cell phone may interrupt an entire audience with a ring. Or a locker room patron may feel justifiably ill-at-ease upon seeing other locker room patrons making use of camera phones or digital cameras. Or a corporation may wish to prevent near-by unauthorized devices from discovering its wireless networks. These and other examples illustrate some of the security and privacy concerns resulting from mobile devices, such concerns ranging from unintentional rudeness to critical security and privacy matters. Such mobile device intrusions may be summarized as socially undesirable audible or visual disturbance or unauthorized information or data capture.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide methods and technologies for defining and administering device manners policy ("DMP"), propagating DMP, reception and recognition of, and compliance with DMP. Such policy may be used to communicate to various mobile and other devices the "manners" with which compliance is expected or required. Similar to some of the social manners honored among people, such as with "no smoking" or "employees only" zones, "no swimming" or "no flash photography" areas, and scenarios for "please wash your hands" or "no talking out loud", devices may recognize and comply with analogous "device manners" policy.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided herein below in connection with the appended drawings is intended as a description of the present examples and is not intended to represent the only forms in which the present example may be constructed or utilized. The description sets forth the functions of the examples and/or the sequence of steps for constructing and operating the examples. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different types of computing and networking environments.

Figure 1:
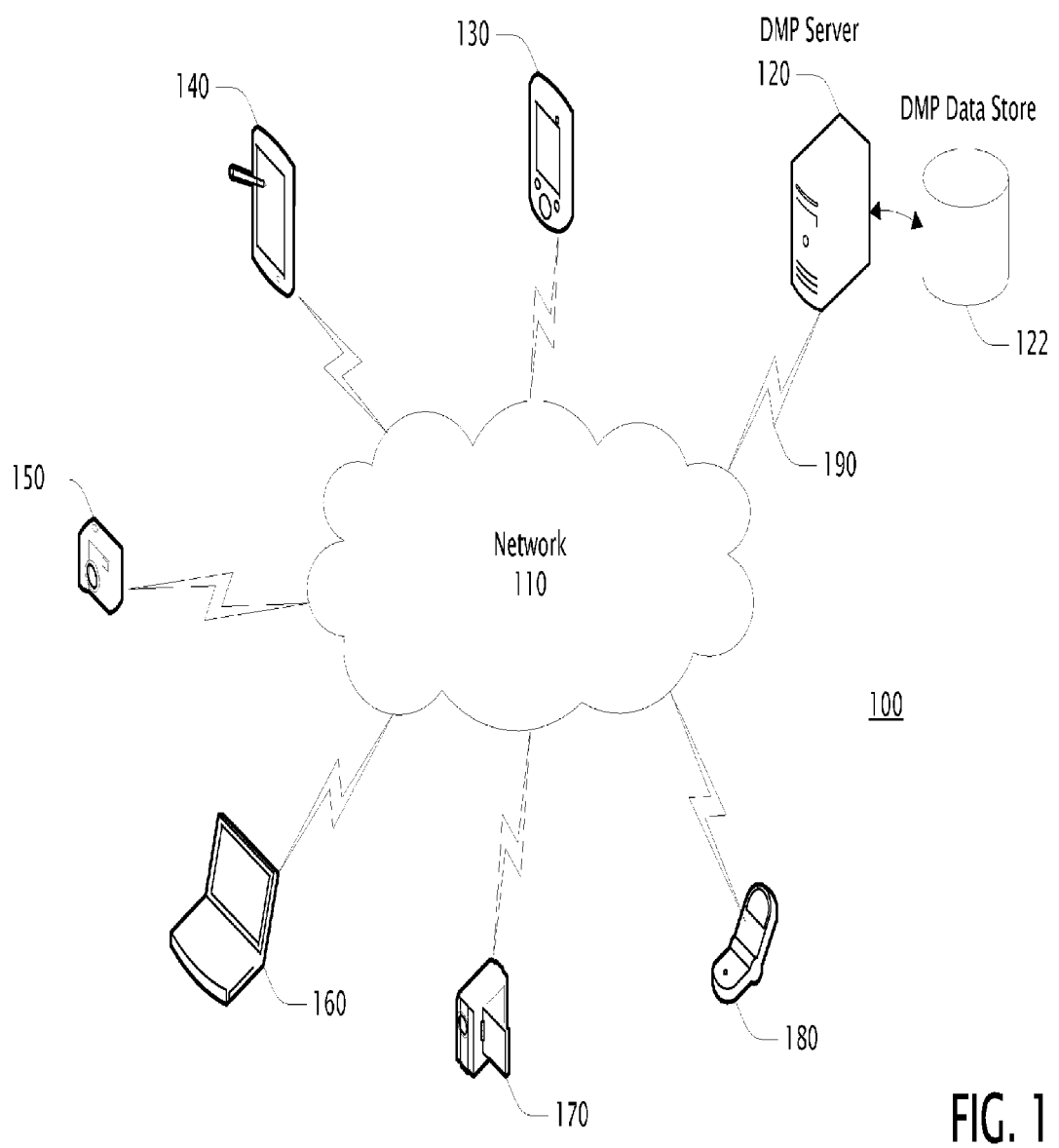
FIG. 1 is a block diagram showing example mobile devices coupled to together via a network and to a device manners policy ("DMP") server and database.

FIG. 1 is a block diagram showing example mobile devices coupled to together via a network 110 and to a device manners policy ("DMP") server 120 and database 122. Example devices may include personal data assistant ("PDA") 130, tablet personal computer ("PC") 140, digital camera 150, laptop PC 160, digital video recorder ("DVR") 170, and cell phone 180. Such devices should be operable to at least receive, recognize and/or support device manner policies. Some such devices may include computing environments such as that described in connection with FIG. 5. Many other devices may also be coupled via network 110 or other means, including a watch with an alarm, shoes with lights (such as some children's shoes), game devices, audio recorders, or any other device for which device manners recognition and compliance may be of value. Such devices may include mobile devices or other devices such as desktop PCs, servers, set top boxes, appliances, or any other type of non-mobile device that may benefit from device manners recognition and compliance, Further examples of such devices include vehicles or any other device, system, construct, composition, or the like operable to at least receive, recognize and/or support device manner policies.

Devices may be coupled to network 110 via any operable link, such as example link 190. Such links may include a network interface card ("NIC"), a serial or parallel port, a data bus, an analog interface, or the like, may be wired or wireless, may make use of infrared ("IR"), acoustics, optics, radios frequency ("RF"), or the like. Network 110 may be an ad-hoc network with mobile devices coupling transiently. Server devices, such as server 120, and other less mobile devices, may be coupled to network 110 more persistently than mobile devices. In one example, network 110 may be a wireless fidelity ("Wi-Fi") network at a coffee shop, city library, courtroom, or airport lounge. Mobile and other devices may typically link to such a Wi-Fi network via wireless adapters. Such devices may also be operable to link to other types of networks. In another example, cell phones may link to a cellular network via appropriate RF adapters and protocols. Such cell phones may also be operable to link to other types of networks, such as Wi-Fi networks or the like.

In one example, DMP server 120 and database 122 may be a DMP appliance—a special-purpose device or system or the like primarily intended to provide DMP server and/or database functionality. Such a DMP appliance may be coupled to network 110 via any operable link, such as example link 190. Alternatively, a DMP appliance may provide a subset of DMP server and database functionality and/or may not be coupled to a network. Such an appliance may simply emit policy via RF means or acoustic means or the like.

Figure 2:
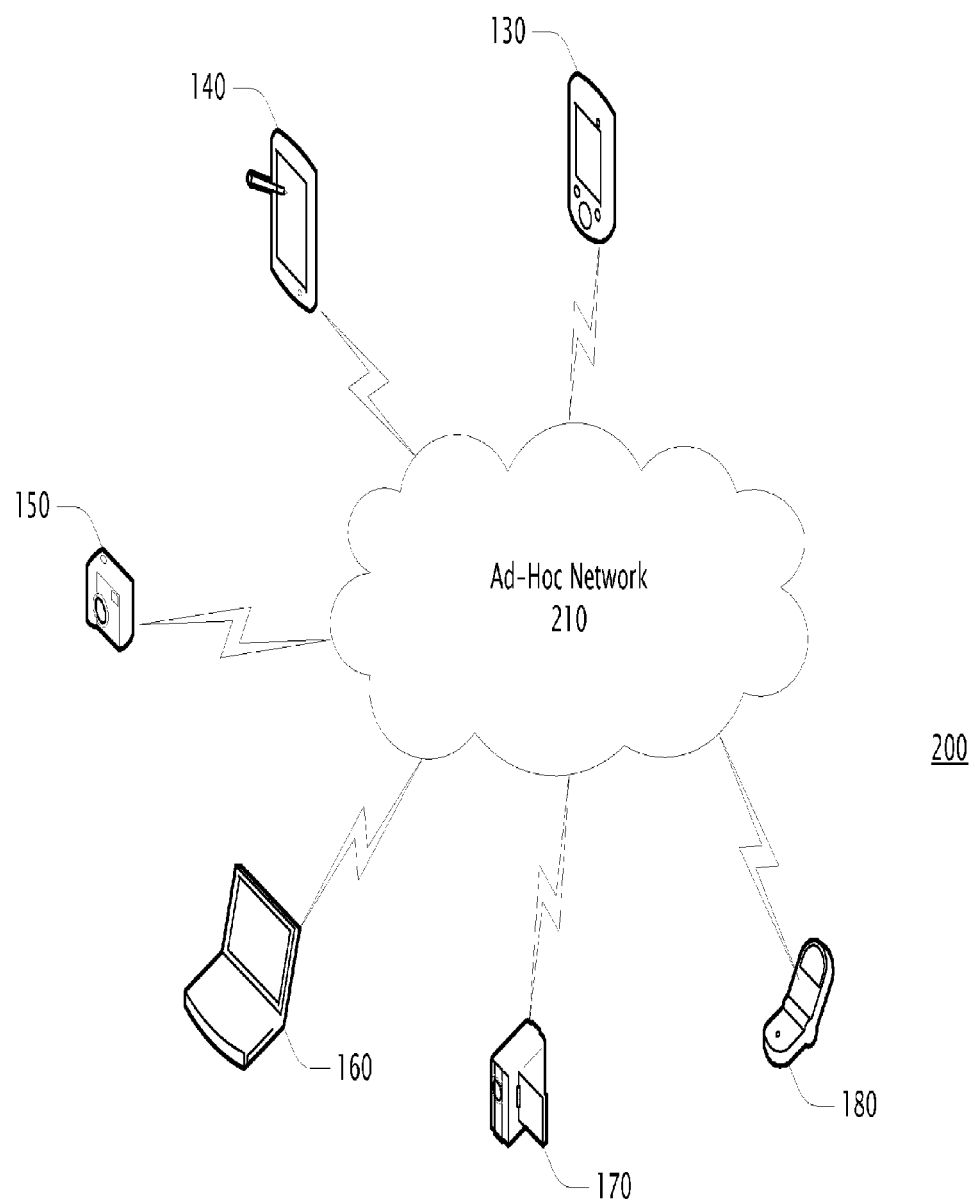
FIG. 2 is a block diagram showing example mobile devices coupled to together via an ad-hoc network.

FIG. 2 is a block diagram showing example mobile devices coupled to together via an ad-hoc network 210. Such an ad-hoc network may not include any persistent devices such as DMP servers or related data stores. Ad-hoc networks for DMP purposes may be formed as various mobile devices form and join such networks. For example, an ad-hoc network may be formed comprising devices of people on a particular bus. Example devices shown in FIG. 2 include those described in connection with FIG. 1.

Figure 3:
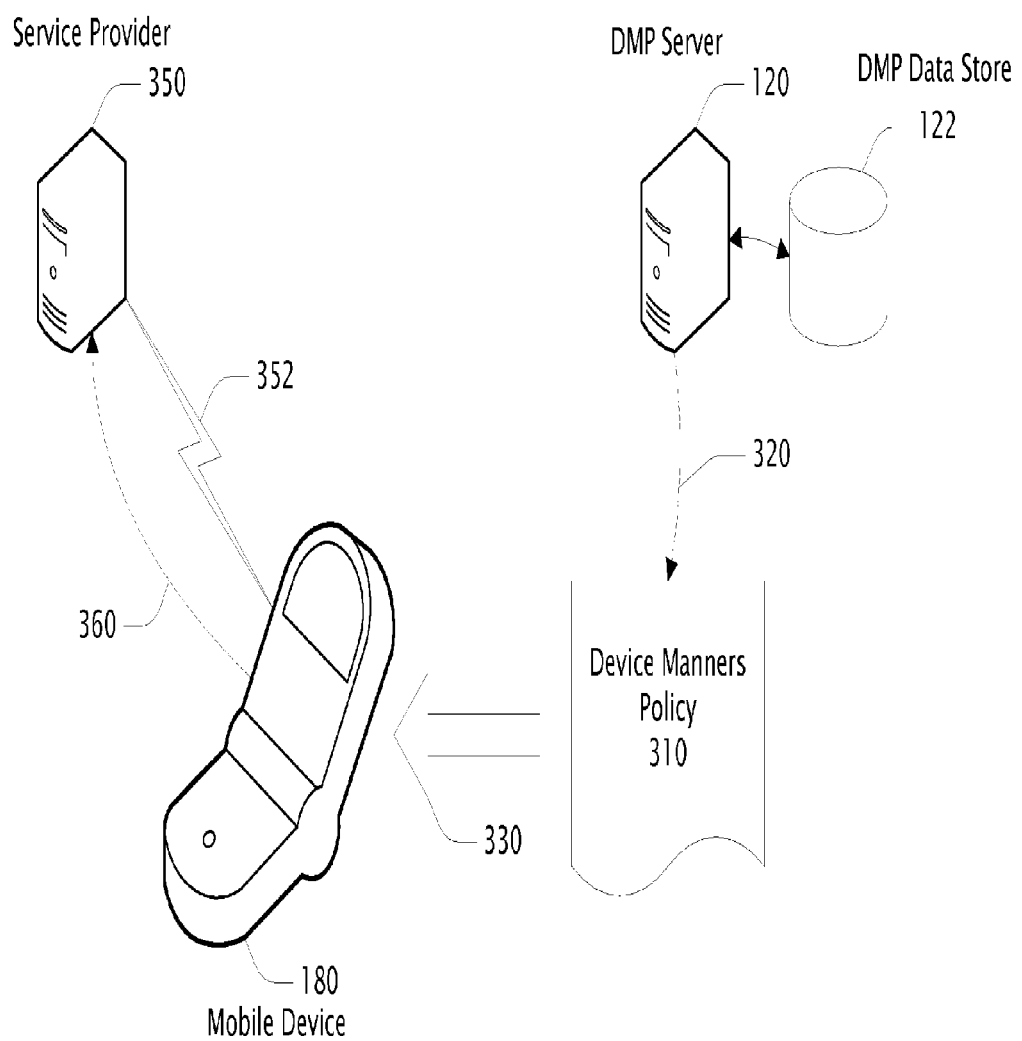
FIG. 3 is a block diagram showing an example device manners policy ("DMP") applied to an example mobile device.

FIG. 3 is a block diagram showing an example device manners policy ("DMP") 310 applied to an example mobile device 180 as indicated by arrow 330. Such a DMP may originate from a DMP server, such as server 120 and related data store 122, and may be transferred or downloaded 320 to a device such as mobile device 180. Alternatively, DMP 310 may be created on device 180 or transferred to device 180 via other means.

Upon receipt of DMP 310 by device 180, DMP 310 may be evaluate to determine what, if any, compliance may be suggested or required. In one example, a DMP may be received by cell phone 180 upon entering a hospital, the DMP requiring no cell phone usage. Cell phone 180 may be operable to comply with such a DMP by shutting down, entering a sleep mode, or the like. Upon leaving the hospital cell phone 180 typically returns to its previous mode of operation as the hospital DMP is no longer applicable.

In another example, service provider 350 may require that a device provide an indication of DMP compliance capability prior to or for continuation of services, such as over link 352. Device 180 may provide such an indication 360 to service provider 350 to satisfy the requirement. Further, service provider 350 may transfer various DMPs to device 180 in connection with the services provided. For example, a museum may include service provider 350 to provide wireless data access to various devices though which information about the exhibits may be accessed. Provider 350 may further propagate a DMP indicating "no photography". Devices receiving such DMP upon entry to the museum typically initiate compliance with the "no photography" DMP by disabling any photography capabilities, such as provided by cell phone cameras, digital cameras, and digital video recorders. Access to exhibit data may be subject to indication of compliance.

In yet another example, the "no photography" DMP may be provided in the form of a special tag such as a unique watermark (generally not visible to humans), radio frequency identification ("RFID") device, or the like located on or near various exhibits, such a tag being detectable and/or identifiable by a DMP-enabled device via optical, RF, or other appropriate means. In this example a network, ad-hoc or otherwise, may not be required for at least some forms of DMP compliance.

In yet another example, a "no recording" DMP may be provided in the form of an audio signal, typically inaudible to human listeners, in connection with music or some other audio or audio/video reproduction. Such an audio signal may be detected and identified by a DMP-enabled device such as a digital recorder, a digital video recorder, or the like. In this example a network, ad-hoc or otherwise, may not be required for at least some forms of DMP compliance.

In yet another example, a "no noise" or "no light" DMP may be provided via a network, audio means, or any other suitable means or combination of means, the DMP being detectable and/or identifiable by a DMP-enabled device such as a device that may emit light or sound including, but not limited to, watches with audible alarms, shoes with lights (as sometimes worn by children, for example), cameras, flashlights, cell phones, PDAs, or any other device that may benefit from compliance with a "no noise" or "no light" DMP or the like.

In yet further examples, DMPs may be used in particular zones to limit the speed and/or acceleration of vehicles, to require the use of lights, to verify an indication of insurance coverage and/or current registration, or the like. DMPs may be propagated with acceptable usage times for mobile devices, such as when on an airplane with being restrictions common at times of landing and/or take-off. DMPs may be used to cause devices to be reconfigured for silent operation in locations such as libraries, court rooms, hospitals, meeting rooms, theatres, or the like.

In ad-hoc scenarios, DMPs may be the result of voting or a consensus among current members of an ad-hoc network or the like. For example, the majority of current bus riders may agree upon and propagate "silence please" DMPs that cause cell phones to reconfigure for vibrate versus audible rings, that cause audio devices to work only with headphones, that cause gaming devise to switch to a silent mode of operation, and the like.

In general, DMPs may be applied to devices when within a particular zone or area to which the DMPs apply. Upon leaving such zones or areas a device is typically reconfigured to resume it former mode of operation. For example, a cell phone device reconfigured to a vibrate mode as a result of detecting a "silence" DMP upon hospital entry will typically return to its previous ring mode when leaving the hospital zone. In other scenarios, a device may revert back to a previous configuration when leaving a virtual community such as may be established via an ad-hoc network. Such DMP zones, areas, communities, or the like may be defined and/or indicated in any manner useful for DMP propagation and compliance purposes.

DMP 310 typically includes one or more device manners ("DM") that specify particular device behaviors or rules to which device compliance is requested or expected. Typically it is the responsibility of the device itself to comply with any applicable DMs in a recognized DMP, as well as determining applicability. Device compliance is generally achieved via self-reconfiguration. Restoration of a device's previous configuration typically occurs when a DMP is no longer applicable, such as when the device is no longer in the DMP's zone, area, community, or the like. Additionally or alternatively, a DMP may include an expiration time, a time-out period, or the like, upon which a device in compliance with such a DMP may revert back to a previous configuration. Further, a DMP may require that a hosting device report its compliance status back to the source of the DMP such that non-compliant devices, or the compliance status of devices, may be noted by a DMP environment.

DMP 310 may be implemented as a data structure, an electronic signal, represented via extensible markup language ("XML") or the like, expressed as an image, or otherwise implemented, expressed, and/or represented sufficient to be recognizable, detectable and/or identifiable by a DMP-enabled device. In some examples, DMPs may be created, modified, propagated to/from, and/or stored in example DMP data store 122, example DMP server 120, example service provider 350, example device 180, and/or other devices or the like.

Figure 4:
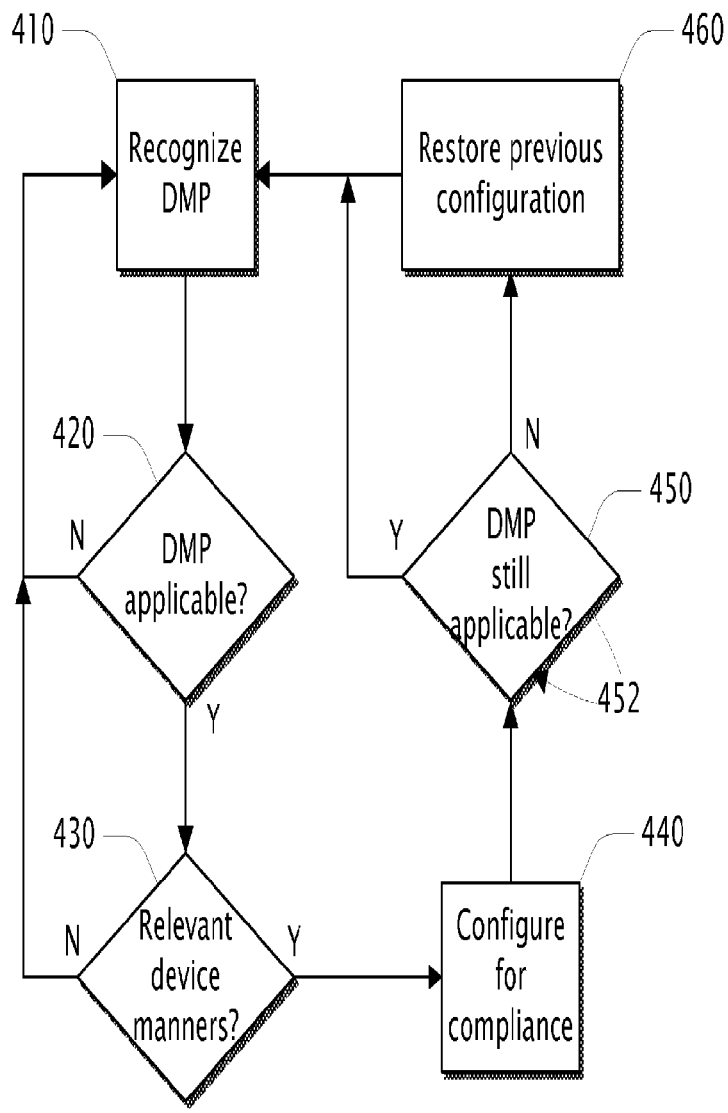
FIG. 4 is a block diagram showing an example process for recognizing a DMP and configuring a device to comply with the DMP.

FIG. 4 is a block diagram showing an example process 400 for recognizing a DMP and configuring a device to comply with the DMP. Block 410 indicates a device recognizing a DMP. In one example, the DMP is received by the device over a network or the like. In another example, the DMP is detected via an optical means, acoustic means, electromagnetic means, or some other means suitable for DMP recognition purposes. In general, example process 400 continuously seeks to recognize a DMP, continuing at block 420 once a DMP is recognized.

Block 420 indicates evaluating the recognized DMP to determine if it is applicable to the device. If the DMP is applicable, example process 400 continues at block 430; otherwise it continues at block 410. For example, if the DMP relates to library zone and the device is within the library zone, then the DMP is considered applicable. But if the device recognizes the DMP but is not within the library zone, then the DMP is not considered applicable.

Block 430 indicates evaluating the applicable DMP to identify any device manners of the DMP that are relevant to the device. If one or more of the device manners are relevant, example process 400 continues at block 440; otherwise it continues at block 410. For example, if the DMP specifies a "silence please" device manner and the device is a cell phone, then the device manner is relevant. But if the device is a child's shoe including flashing lights but no sound feature, then the device manner is not considered relevant.

Block 440 indicates configuring the device for compliance with any relevant device manners specified in the applicable DMP. In one example, the cell phone is configured for silent operation, disabled entirely, or the like so as to comply with the DMP. In some examples, the device may configure itself for compliance. Once the device is configured for compliance, example process 400 continues at block 450.

Block 450 indicates testing to determine if a previously-determined applicable DMP is still applicable. If such a DMP is still applicable, example process 400 continues at block 410; otherwise it continues at block 460. Such tests may be performed periodically, continuously, or the like once a device has been configured for DMP compliance (as indicated by loop 452), and may continue even while process 400 seeks to recognize other DMPs. For example, a cell phone may have recognized and complied with a DMP including a "silence please" device manner for a library zone. The cell phone may periodically test to determine if the DMP is still applicable, that is if the cell phone is still in the library zone. Continued applicability may additionally or alternatively be tested by other means, such as using GPS data to determine if the cell phone is still in the library zone. Such a means may not require that a device maintain or obtain contact with a DMP server or the like. Information useful for continued applicability testing may be provided, at least in part, with the DMP, or may be obtained independent of the DMP and/or of a DMP environment.

Block 460 indicates restoring a previous configuration once a DMP is fund to be no longer applicable. For example, if a cell phone had been configured for silent operation while a "silence please" DMP was applicable, a previous non-silent configuration may be restored should the DMP be found to no longer be applicable. Once the device's previous configuration is restored, example process 400 continues at block 410.

Figure 5:
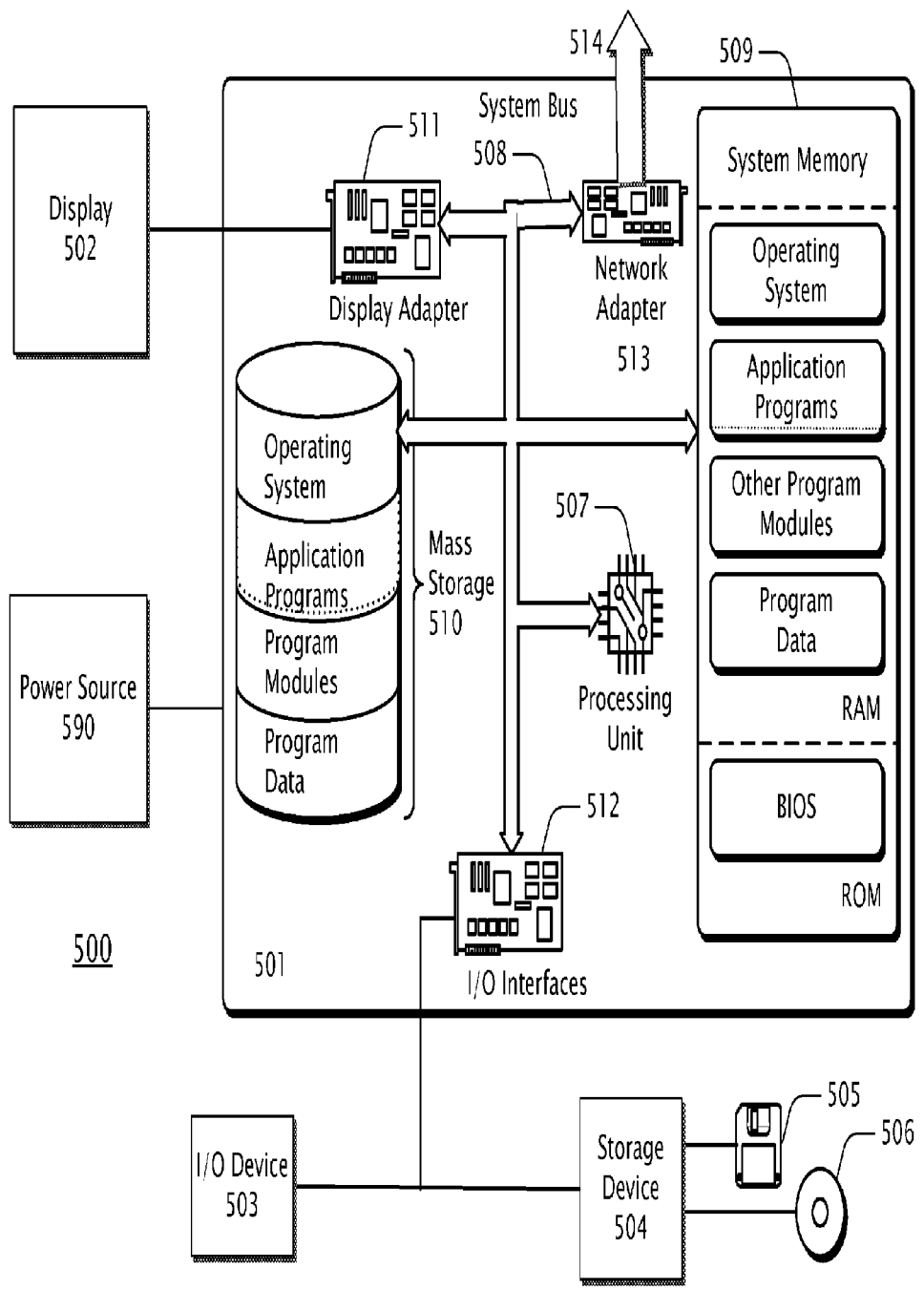
FIG. 5 is a block diagram showing an example computing environment in which the technologies and processes described above may be implemented.

FIG. 5 is a block diagram showing an example computing environment 500 in which the technologies and processes described above may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("µP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 502, I/O device 503, or many of the other components described in connection with FIG. 5. Other mobile devices that may not include many of the components described in connection with FIG. 5, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like. Further, the term "computer-readable media" refers to a statutory article of manufacture that is not a signal or carrier wave per se.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A computing device comprising:
 at least one processor;
 memory coupled to the at least one processor; and
 at least one program module stored at least in part in the memory, the computing device configured according to the at least one program module to:
 obtain a device manners policy that specifies a particular behavior with which compliance by a plurality of devices that includes the computing device is requested or expected, where the device manners policy is a result of voting among the plurality of devices;
 comply with the obtained device manners policy; and
 receive a service based on compliance by the computing device with the obtained device manners policy.

2. The computing device of claim 1 wherein the device manners policy is embodied as a watermark.

3. The computing device of claim 1 wherein the obtained device manners policy is obtained via an audio signal.

4. The computing device of claim 1 wherein the compliance is based on self-reconfiguration by the computing device in accordance with the obtained device manners policy.

5. The computing device of claim 1 further configured to provide an indication of the compliance with the obtained device manners policy.

6. The computing device of claim 5 further configured to receive a service provided in response to the provided indication of the compliance with the obtained device manners policy.

7. The computing device of claim 1 wherein the computing device is a mobile device configured for linking to a cellular network.

8. A method performed on a computing device comprising at least one processor, memory, and at least one program module that together are configured for causing the computing device to perform the method comprising:
   obtaining, by the computing device, a device manners policy that specifies a particular behavior with which compliance by a plurality of devices that includes the computing device is requested or expected, where the device manners policy is a result of voting among the plurality of devices;
   complying, by the computing device, with the obtained device manners policy; and
   receiving, by the computing device based on the complying, a service.

9. The method of claim 8 wherein the device manners policy is embodied as a watermark.

10. The method of claim 8 wherein the obtained device manners policy is obtained via an audio signal.

11. The method of claim 8 wherein the compliance is based on self-reconfiguration by the computing device in accordance with the obtained device manners policy.

12. The method of claim 8 further comprising providing an indication of the compliance with the obtained device manners policy.

13. The method of claim 8 wherein the computing device is a mobile device configured for linking to a cellular network.

14. A system comprising:
   a computing device that includes at least one processor and memory; and
   at least one program module stored at least in part in the memory,
   the computing device configured according to the at least one program module to comply with a device manners policy that specifies a particular behavior with which compliance by a plurality of devices that includes the computing device is requested or expected, where the device manners policy resulted from a vote among the plurality of devices,
   the computing device further configured according to the at least one program module to receive a service based on compliance by the computing device with the device manners policy.

15. The system of claim 14 wherein the device manners policy is embodied as a watermark.

16. The system of claim 14 where the device manners policy is obtained via an audio signal.

17. The system of claim 14 where the compliance is based on self-reconfiguration by the computing device in accordance with the device manners policy.

18. The system of claim 14, the computing device further configured to provide an indication of the compliance with the device manners policy.

19. The system of claim 18, the computing device further configured to receive a service provided in response to the provided indication of the compliance with the device manners policy.

* * * * *